United States Patent Office 3,424,844
Patented Jan. 28, 1969

3,424,844
PHENYLCARBAMOYLAZIDES IN REDUCING BLOOD PRESSURE
Leo Ralph Swett, James Daniel Ratajczyk, and Thomas Dillard Darby, Waukegan, Ill., assignors to Abbott Laboratories, Chicago, Ill., a corporation of Illinois
No Drawing. Filed Jan. 30, 1967, Ser. No. 612,355
U.S. Cl. 424—226       8 Claims
Int. Cl. A61k 27/00; C07c 127/12

ABSTRACT OF THE DISCLOSURE

Naphthyl- and certain substituted phenylcarbamoylazides have been found to reduce the blood pressure of warm-blooded animals when administered orally or intravenously.

---

The present invention is directed to lowering blood pressure in warm-blooded animals; more particularly, it is directed to the administration of certain carbamoylazides to warm-blooded animals suffering from elevated blood pressure.

The present invention comprises the process of reducing blood pressure in warm-blooded animals by administering to such an animal an effective dose of a compound of the formula

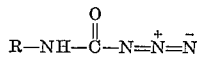

wherein R is phenyl, methoxyphenyl, chlorophenyl, tolyl, chlorotolyl, trifluoromethylphenyl, dichlorophenyl, xylyl or naphthyl in a pharmaceutically acceptable carrier. In lower animals, the above compounds are administered intravenously in solution dosage form with a dose of between 1 and 10 mg./kg. In higher animals, including humans, a dosage of between 2 and 10 mg. is administered orally one to three times per day. The oral dosage form may be in the form of pills, tablets, wafers, syrup or the like, and, quite effectively, the desired dosage can be administered in sublingual form.

The carbamoylazides used in the process of the present invention have a high therapeutic index: they have a relatively low toxicity and are highly effective at small dosages. One of the simplest compounds useful in the method of the present invention, 1-naphthylcarbamoylazide, when applied intravenously in a 5% solution in isotonic salt-water lowers blood pressure by 30 mm. Hg at a dose of 0.33 mg./kg. in animals of lower species; most of the other compounds of the above definition show $ED_{30}$-values (the dosage needed to lower blood-pressure by 30 mm. Hg) of between 0.3 and 10 mg./kg.

The compounds used in the present invention are made in a simple, one-step process comprising treating phenylsemicarbazide or the semicarbazides of phenyl analogs with nitrous acid under diazotization conditions. The desired azides separate from the aqueous reaction mixture and can easily be collected, washed and crystallized from appropriate organic solvents. The semicarbazides used as starting materials can be made in known fashion by reacting aniline or its analogs with an alkali metal cyanate to form the corresponding phenylurea which form the semicarbazides upon reaction with hydrazine.

For specific embodiments of the process for making the carbamoylazides used in the present process, reference is made to the following examples which are given as illustrations only are not meant to limit the invention in any respect. All blood pressures reported are measured in millimeters of mercury.

EXAMPLE 1

A solution of 31.4 g. of 2,5-dimethylaniline hydrochloride in 350 ml. of water is treated at room temperature with a solution of 24.3 g. of potassium cyanate in 200 ml. of water. After stirring the mixture for one hour, the formed urea is isolated by suction filtration, washed with water and crystallized from methanol. The yield of N-(2,5-dimethylphenyl)urea of melting point 210–211° C. is 23.4 g., representing 71% of theory.

A mixture of 18.5 g. of the above urea, 20 ml. of hydrazinehydrate, and 100 ml. of anhydrous ethanol is treated under reflux on a steam-bath for about 30 hours. The alcohol is then removed under reduced pressure and the residue is triturated with water. Crystallization from 50% aqueous methanol produces the N-(2,5-dimethylphenyl)semicarbazide in a yield of 12.9 g. or 64% of theory, showing a melting point of 156–158° C. with subsequent resolidification and remelting at 234–238° C.

A solution of 12.9 g. of the above semicarbazide in 250 ml. of water containing 10 ml. of concentrated hydrochloric acid is treated at 5° C. with 9 ml. of a saturated solution of sodium nitrite. The crude azide which separates is collected, washed with water and air-dried. Crystallization of the solid material from hexane yields 6.7 g. (49% of theory) of 2,5-dimethylphenylcarbamoylazide melting at 120–121° C.

The blood pressure response of the above compound was studied in 6 cats. Each cat was anesthetized with 30 mg./kg. of sodium pentobarbital administered intravenously. Mean arterial blood pressure was measured from a femoral artery on a Grass polygraph by a Statham pressure transducer. The drug was dissolved in isotonic saline and injected into a femoral vein. An average of 30 mm. blood pressure reduction was achieved by injecting 1.80 mg./kg. of the above compound. At 2 mg./kg. the drug effect lasted 112 minutes; the systolic pressure was reduced by 50 mm., the diastolic pressure by 44 mm.

EXAMPLE 2

By following the process of Example 1 but replacing 2,5-dimethylaniline used there with unsubstituted aniline, phenylcarbamoylazide melting at 107–108° C. is obtained. The intravenous dose producing a 30 mm. blood pressure drop is less than 1 mg./kg. when injected into anesthetized cats in the manner described in Example 1. At an intravenous dose of 2 mg./kg. the average blood pressure reduces from 112 mm. to 52 mm.; the effect so produced lasts for 66 minutes. At 5 mg./kg., a pressure drop from 121 mm. to 93 mm. is observed with a duration of the effect of 70 minutes.

EXAMPLE 3

By replacing the dimethylaniline used in Example 1 with 1-naphthylamine, 1-naphthylcarbamoylazide melting at 128–129° C. is obtained. Its $ED_{30}$ is about 0.33 mg./kg. The effect of 2 mg./kg. injected intravenously into anesthetized cats lasts for 55 minutes while at 5 mg./kg. a pressure drop of from 117 mm. to 75 mm. lasting for 140 minutes is observed.

EXAMPLE 4

By replacing the 2,5-dimethylaniline of Example 1 with 2-toluidine, 2-tolylcarbamoylazide melting at 98–99° is obtained. Its $ED_{30}$ is 0.67 mg./kg.

EXAMPLE 5

By replacing the aniline derivative in Example 1 with 2-chloroaniline, the process described there produces 2-chlorophenylcarbamoylazide melting at 56–77° C. Its $ED_{30}$ is about 1.5 mg./kg.

EXAMPLE 6

When using 2-methoxyaniline in place of 2,5-dimethylaniline, the process described in Example 1 produces 2-methoxyphenylcarbamoylazide melting at 47.5–49° C.; its $ED_{30}$ is 0.33 mg./kg.

EXAMPLE 7

By using 2-methyl-3-chloroaniline in place of 2,5-dimethylaniline used in Example 1, the process described there produces 2-methyl-3-chlorophenylcarbamoylazide melting at 116.5–118° C. and showing an $ED_{30}$ is 5.8 mg./kg.

EXAMPLE 8

By replacing the 2,5-dimethylaniline of Example 1 with 3-trifluoromethylaniline, the above process produces 3-trifluoromethylphenylcarbamoylazide, which is first obtained as an oil but crystallizes under refrigeration. It has a melting point of 50–53° C. and an $ED_{30}$ of about 1 mg./kg.

EXAMPLES 9–20

The following table refers to other compounds made by following the detailed outline of Example 1. All of these examples refer to compounds of formula $$R-NH-CO-N_3$$

with R being identified below.

| Ex. No. | R | Melting point in °C. |
|---|---|---|
| 9 | 3-tolyl | 104.5–106.5 |
| 10 | 4-tolyl | 132–133 |
| 11 | 2,3-xylyl | 109–109.5 |
| 12 | 2,4-xylyl | 131.5–132.5 |
| 13 | 2,6-xylyl | 139–140 |
| 14 | 3,4-xylyl | 78–81 |
| 15 | 3-chlorophenyl | 110–111 |
| 16 | 4-chlorophenyl | 113–116 |
| 17 | 2,3-dichlorophenyl | 95–96 |
| 18 | 2,5-dichlorophenyl | 97–99 |
| 19 | 3-methoxyphenyl | 96–97 |
| 20 | 4-methoxyphenyl | 113.5–114.5 |

The method of the present invention is very effective in lowering blood pressure when administered by the intraduodenal, intravenous, intramuscular, oral or subcutaneous routes. Some of the compounds referred to above are also suitable for sublingual administration. The new method reduces hypertension elicited by intravenous administration of epinephrine and lowers the work-load imposed on the heart by stress and thus acts similar to nitroglycerine. However, the compounds disclosed above have the advantage over nitroglycerine in that the effect of the application lasts nearly 10 times longer.

For the oral dosage form, the above described compounds can be incorporated into the usual pharmaceutical carriers together with the customary excipients such as flavoring agents, fillers, granulating agents and for other routes of administration the active material can be dispersed, suspended or dissolved in water or saline in the presence or absence of dispersing agents, thickeners, buffers, preservatives or other customary excipients. For oral dosage forms, pills or tablets are suitable; they may be coated or uncoated.

The usual dosage administered to warm-blooded animals according to the present invention is between 1 and 10 mg. per day for higher animals or between 2 and 10 mg./kg. per day for lower animals. In each case, the daily dosage may be split into 2 or 3 individual dosages. The average dosage required in lower animals to reduce the blood pressure by 30 mm. is between 0.3 and 10 mg./kg. with a duration of effect of between 30 minutes and 3 hours. Both the systolic and diastolic blood pressures are effected by the method of the present invention.

We claim:

1. The process of reducing blood pressure in warm-blooded animals, which comprises administering to said animal a blood pressure reducing amount of a compound of the formula $$R-NH-\overset{O}{\underset{\|}{C}}-N=\overset{+}{N}-\overset{-}{N}$$

wherein R is phenyl, methoxyphenyl, chlorophenyl, tolyl, 2-methyl-3-chlorophenyl, trifluoromethylphenyl, dichlorophenyl, xylyl or naphthyl, in a pharmaceutically acceptable carrier.

2. The process of claim 1 wherein said carrier is an isotonic salt solution and said administration is carried out by intravenous injection.

3. The process of claim 1 wherein R is phenyl.

4. The process of claim 1 wherein R is 2-tolyl.

5. The process of claim 1 wherein R is 3-trifluoromethylphenyl.

6. The process of claim 1 wherein R is 2,3-xylyl.

7. The process of claim 1 wherein R is 2-methoxyphenyl.

8. The process of claim 1 wherein R is 1-naphthyl.

References Cited

UNITED STATES PATENTS 3,376,319  4/1968  Weil et al. _____ 260—349

FRANK CACCIAPAGLIA, Jr., *Primary Examiner.*

S. J. FRIEDMAN, *Assistant Examiner.*